W. R. BUTNER.
HAY RAKE.
APPLICATION FILED OCT. 16, 1917.
1,294,233.
Patented Feb. 11, 1919.
2 SHEETS—SHEET 1.
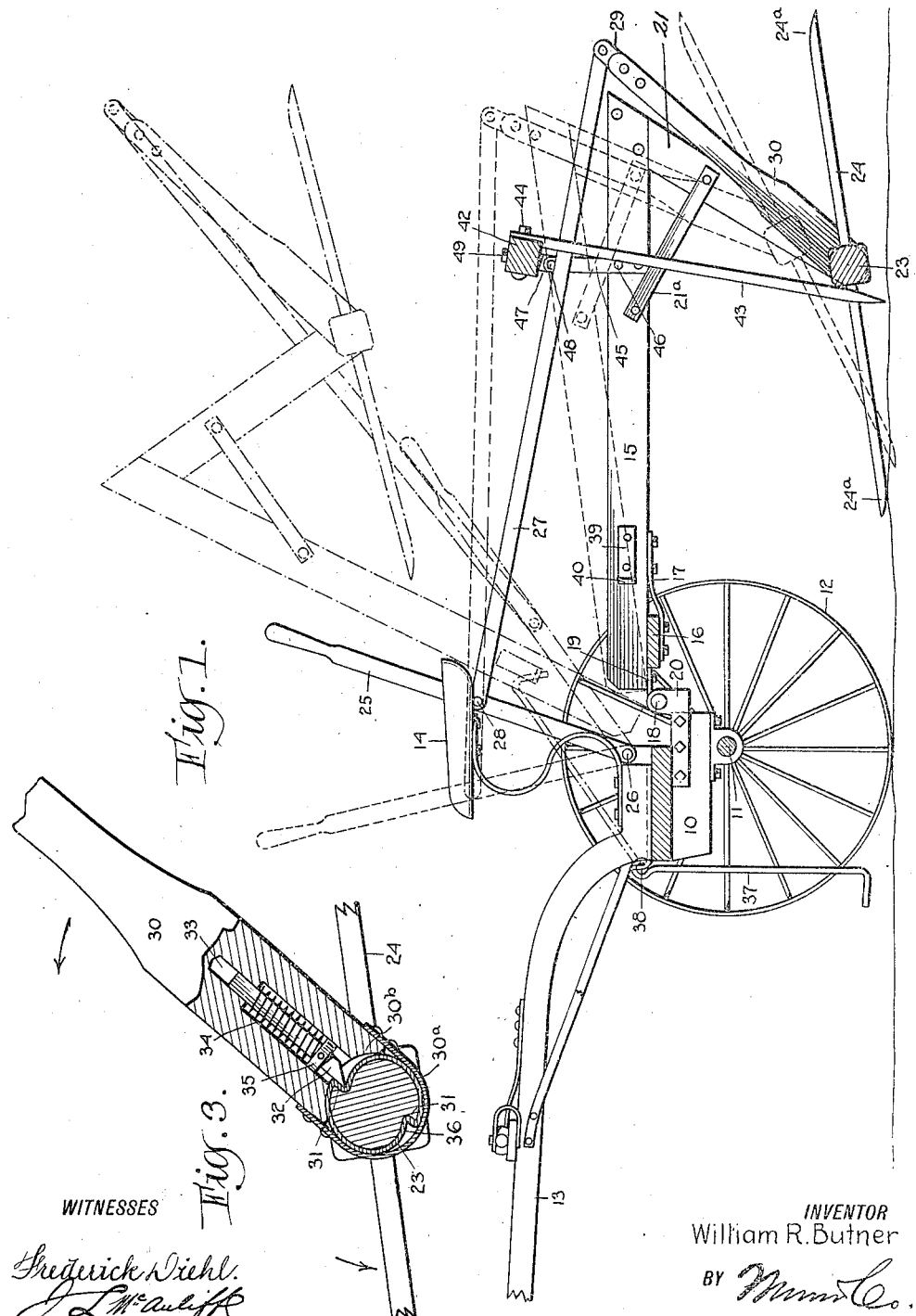
WITNESSES
Frederick Diehl.
J. L. McAuliff
INVENTOR
William R. Butner
BY
ATTORNEYS

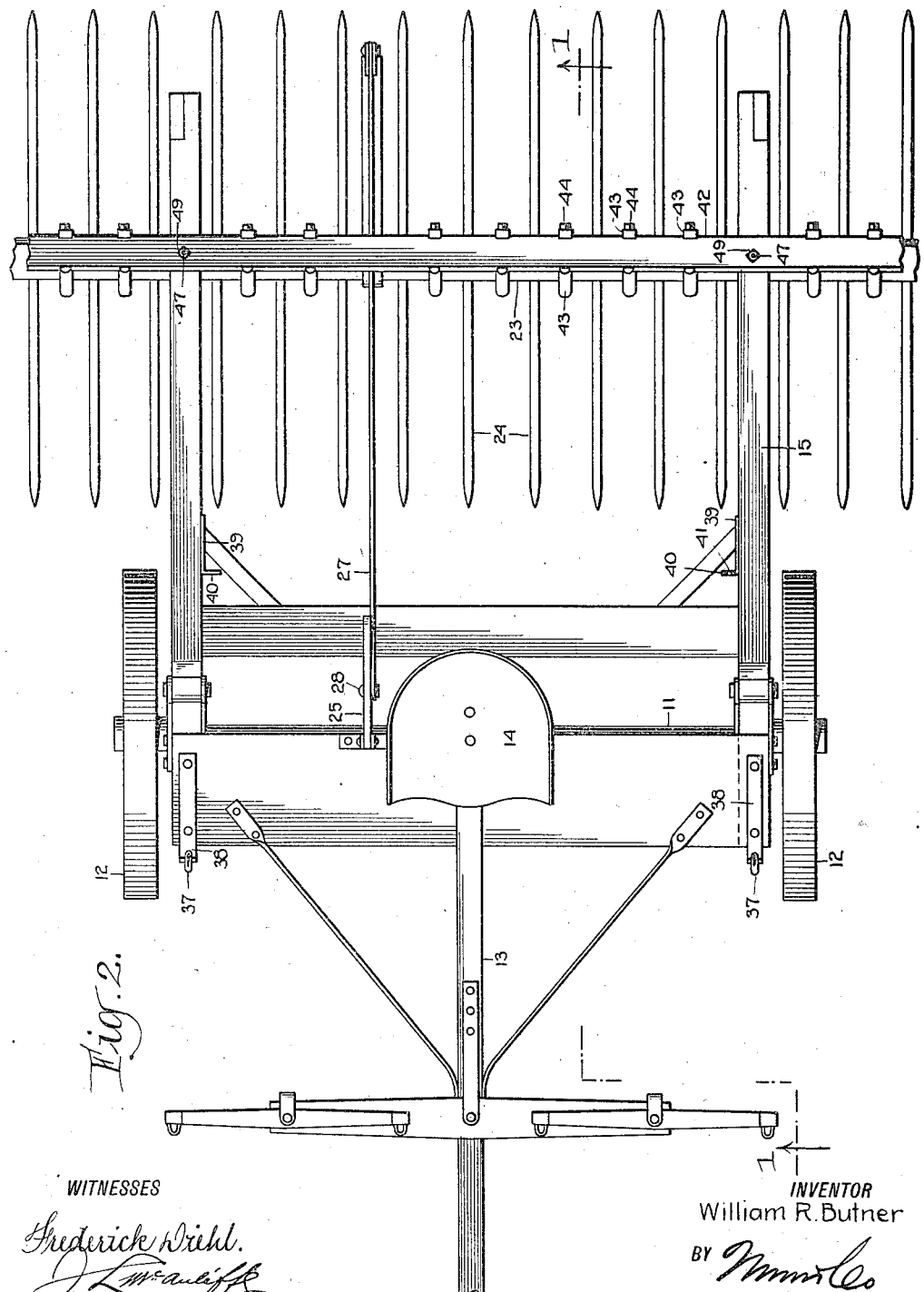

UNITED STATES PATENT OFFICE.

WILLIAM RICHARDSON BUTNER, OF TOPAZ, CALIFORNIA, ASSIGNOR OF ONE-THIRD TO HIMSELF, AND ONE-THIRD TO THOMAS R. SEAMON, AND ONE-THIRD TO WALTER E. BUTLER, BOTH OF TOPAZ, CALIFORNIA.

HAY-RAKE.

1,294,233.   Specification of Letters Patent.   Patented Feb. 11, 1919.

Application filed October 16, 1917.   Serial No. 196,878.

*To all whom it may concern:*

Be it known that I, WILLIAM R. BUTNER, a citizen of the United States, and resident of Topaz, in the county of Mono and State of California, have invented a new and Improved Hay-Rake, of which the following is a full, clear, and exact description.

My invention relates to hay rakes that dump by a revolving movement.

An object of the invention is to provide a wheeled or riding rake in which the rake dumps by revolving movement and is manually controlled by the driver to position the rake for raking or for causing it to be dumped automatically.

An object also is to effect the operation and control of the rake without gearing or complicated connections liable to get out of order.

An important object of the invention further is to provide a rake of the character referred to so constructed and operating in such a manner as to leave the hay in the windrow in a proper condition for curing and in condition permitting it to be easily forked from the windrow for cocking.

Another object is to provide in connection with the main revoluble rake an auxiliary non-revoluble rake presenting approximately upright teeth and so hung on the rake frame as to accommodate itself to the turning movements of the main rake.

The stated objects and others as will appear are attained by a revoluble rake that may be maintained with the teeth at a proper position for raking or be rocked through a slight angle to a position for the teeth to penetrate the ground and thereby cause the rake to be automatically turned through a sufficient arc for dumping. Controlling means are provided so arranged as to be operable to restore the rake to raking position after turning through the dumping angle and again to the raking position.

Reference is to be had to the accompanying drawings forming a part of this specification, in which similar reference characters indicate corresponding parts in all the views, it being understood that the drawings are merely illustrative of one example of the invention.

Figure 1 is a longitudinal vertical section of a wheeled rake embodying my invention, the section being taken on the line 1—1, Fig. 2;

Fig. 2 is a plan view thereof;

Fig. 3 is a detail in transverse vertical section showing the means for controlling the ratchet means for the revoluble rake.

In carrying out my invention in practice any suitable body or frame 10 is provided on which is an axle 11 having running wheels 12, any suitable draft means being employed, there being a tongue 13 shown for use with draft animals. The numeral 14 indicates a seat.

A vertically rocking frame 15 is secured to the frame or body 10, the frame in the illustrated form having side bars 16 joined by a cross bar 16 and braces 17. The frame 15 is secured in the present instance by pivot bolts 18 which pass through straps 19 on the side bars of said frame and through ears on straps 20 suitably fastened to the body 10. At the rear end the side bars of the frame 15 consist of downwardly disposed members 21 which may be braced by diagonal braces 21ᵃ.

The main rake consists of a shaft or core 23 and rake teeth or tines 24 secured thereto and extending equally at diametrically opposite sides, so that the turning of the rake through an angle of 180° will position either ends of the tines for raking. The rake is revolubly mounted in suitable bearings in the lower ends of the frame members 21 and it is controlled by a hand lever 25 pivoted at its lower end as at 26 on the frame 10 to be rocked back and forth. A connecting rod or link 27 is pivoted at its front end to the lever 25 as at 28 between the pivot 26 and the lever handle and said rod 27 is pivotally connected at its rear end with the upper end of a ratchet lever 30 loose on the rake 23, the connection between the ratchet lever and the rod 27 in the present instance being through the medium of a strap 29 secured to said lever and to which the said rod is pivoted. As shown in Fig. 3 the lever 30 is loosely secured to the rake 23 by a strap 30ᵃ riveted or otherwise secured at its ends to the said lever. The lower end of the lever is rounded as at 30ᵇ to constitute a bearing against which the rake 23 bears at the upper side. The rake is provided with ratchet teeth or shoulders 31, two being shown diametrically opposite and adapted for engagement by a pawl or dog 32 movable in a recess or pocket 33 in the lever 30. The pawl is normally pressed into engagement with the ratchet teeth 31 by a compression spring 34 housed in a counter-bore of the pocket 33 and bearing at its forward end against a collar 35 on the pawl. In practice the rake shaft or core 23 is preferably of wood and has a metallic wear band 36 around the same at the zone engaged by the pawl 32.

In use the rake is disposed with the tines 24 at a slight angle to the ground surface as indicated in full lines in Fig. 1 with the forward ends of the tines close to the ground, the under side of the tines adjacent to the point being rounded as at 24ª to constitute a runner to permit the teeth to approach the ground without digging into the same and pass under the hay gathering the latter until desired to dump. During the gathering of the hay the driver with his hand on the lever 25 maintains the rake to its work. In order to dump it is necessary only to rock the lever 25 slightly forwardly to give the tines a somewhat more abrupt angle so that they will penetrate the ground as indicated by the lower dotted lines in Fig. 1, thus causing the rake to be dumped automatically by turning through a sufficient arc for the purpose, the lower forward ends of the tines moving relatively rearwardly while the upper ends beyond the axis will turn forwardly past the vertical center in the dumping movement of the rake. In the automatic dumping movement of the rake after the tines are caused to penetrate the ground, it will be readily understood from Fig. 1 that the rake head 23 with its ratchet teeth 31 may freely turn past the pawl 32, the pawl riding on the surface of the rake head 23 and serving to prevent any retrograde movement when the pawl engages a tooth or shoulder 31. The tines having been freed from the ground after the automatic dumping movement, the lever 25 will be rocked rearwardly by the driver thereby swinging the ratchet lever 30 rearwardly to a sufficent extent for the pawl 32 to engage the adjacent ratchet tooth 31 so that a forward vibration of the lever will now give an additional turning movement to the rake to bring it to the raking position by bringing forwardly and to the under side of the rake those projecting tine members that extended upwardly in the previous raking operation.

In the raking action the hay is not rolled over on itself and does not become matted nor closely packed so that when dumped it will be in proper loose condition for curing without being tossed, and also the hay may be readily forked from the windrow in being cocked. By avoiding the use of gearing the construction is simplified and the control facilitated.

The frame 15 and the rake may be raised clear of the ground in going to or from a field as shown by the upper dotted lines in Fig. 1, the rake swinging to the upper and lower positions with the pivots 18 as a center. To hold the rake in the raised position any suitable means may be employed, there being shown hooks 37 which are pivoted to and normally hang from straps 38 on the body 10. The frame 15 and parts carried thereby are raised by swinging the lever 25 to the forward position indicated in dotted lines, Fig. 1. The hooks may be swung from the hanging position, full lines Fig. 1, to the dotted line position, whereby to engage brackets 30 on the side bars of the frame 15 when the latter is raised, said brackets having lateral flanges 40 each being formed with a hole 41 (Fig. 2) to receive a hook 37.

An auxiliary rake is provided in front of the core or head 23 of the main rake to constitute a grass rake. The auxiliary rake includes a transverse bar or rake head 42 and depending tines 43 suitably secured at their upper ends to the bar 42 as by bolts 44. The auxiliary rake is suspended in position on the frame 15, there being shown for the purpose upstanding yokes 45 secured at their lower ends as at 46 to the frame 15 and a bolt 47 pivotally secured to the said yoke by a transverse pin 48, said bolts 47 extending through the bar 42 and provided with nuts 49. Thus, the tines 43 are permitted to hang in front of the rake shaft 23 and against the latter and accommodate themselves to a turning movement of the said rake shaft 23. In the interest of clearness I have omitted the auxiliary rake 42 from the dotted lines.

I wish to state in conclusion that although the illustrated example constitutes a practical embodiment of my invention, I do not limit myself to the mechanical details herein illustrated, since manifestly the same can be considerably varied without departure from the spirit of the invention as defined in the appended claims.

Having thus described my invention, I claim as new, and desire to secure by Letters Patent:

1. In a riding rake, the combination with a frame, of a rake revolubly mounted in the frame, a ratchet lever loose on said rake, a spring-pressed pawl on the ratchet lever, ratchet teeth on the rake engageable by said pawl of the ratchet lever, and means to actuate the lever to turn the rake about its own axis to a position for raking or at a more abrupt angle to cause the rake teeth to penetrate the ground, said rake being revoluble relatively to the ratchet lever through an angle for dumping by engagement of the teeth with the ground, said ratchet teeth being so disposed relatively to the pawl that always the tooth which is at the upper side of the rake head or engageable with the pawl, faces rearwardly, whereby the teeth in the dumping movement of the rake may slip past the pawl.

2. In a riding rake, a wheeled main frame, a rake frame pivoted at its forward end to the main frame, a rake revolubly mounted in the said rake frame, a ratchet lever loose on the said rake, ratchet teeth on the rake adapted to be engaged by said lever, a manually controlled lever fulcrumed on the main frame, a rod connecting the said manually controlled lever with the ratchet lever, the ratchet lever being movable by a movement of the manually controlled lever for disposing the revoluble rake in raking position and said manually controllable lever being movable to a forward position to raise the rake frame and its rake to a height to position and sustain the rake with the rake teeth clear of the ground irrespective of the angular position of said teeth, together with a hook swingably hung on the frame at a side thereof near the front, and an eye on a side bar of the frame, the hook being of a length to be engageable with said eye when the frame is lifted by the lever in the last-mentioned position.

3. In a riding rake, a rake frame, a rake revolubly mounted on the said frame, means to hold the rake against dumping, said rake being adapted to turn in dumping, and an auxiliary rake at the front of the main rake, said auxiliary rake being pivotally supported on the said frame and presenting depending approximately vertical upright tines in front of and adapted to lie against the revoluble rake.

4. A rake of the class described including a frame, a rake revolubly mounted and adapted to be disposed at an angle for raking or to a position at a more abrupt angle to cause the rake to be turned for dumping, controlling means for said rake, and an auxiliary rake supported on said frame and presenting tines disposed in front of the revoluble rake and relatively to which auxiliary rake the main rake may turn.

WILLIAM RICHARDSON BUTNER.

Copies of this patent may be obtained for five cents each, by addressing the "Commissioner of Patents, Washington, D. C."